(No Model.)

A. N. WOLF.
DUST COLLECTOR.

No. 432,350. Patented July 15, 1890.

Witnesses:
E. P. Ellis
J. M. Nesbit

Inventor:
A. N. Wolf
per Lehmann & Pattison, Attys

UNITED STATES PATENT OFFICE.

ABRAHAM N. WOLF, OF ALLENTOWN, PENNSYLVANIA.

DUST-COLLECTOR.

SPECIFICATION forming part of Letters Patent No. 432,350, dated July 15, 1890.

Application filed May 6, 1890. Serial No. 350,746. (No model.)

*To all whom it may concern:*

Be it known that I, ABRAHAM N. WOLF, of Allentown, in the county of Lehigh and State of Pennsylvania, have invented certain new and useful Improvements in Dust-Collectors; and I do hereby declare the following to be a full, clear, and exact description of the invention, such as will enable others skilled in the art to which it pertains to make and use it, reference being had to the accompanying drawings, which form a part of this specification.

My invention relates to an improvement in dust-collectors; and it consists in the arrangement and construction of parts hereinafter described.

The object of my invention is to provide a dust-collector for flouring-mills which is provided with cones which are so arranged in relation to each other that the dust is separated from the air by being made to come in contact with them, and in which the air which carries the dust into the collector is made to operate the arm which forces the dust out of the collector.

Figure 1:
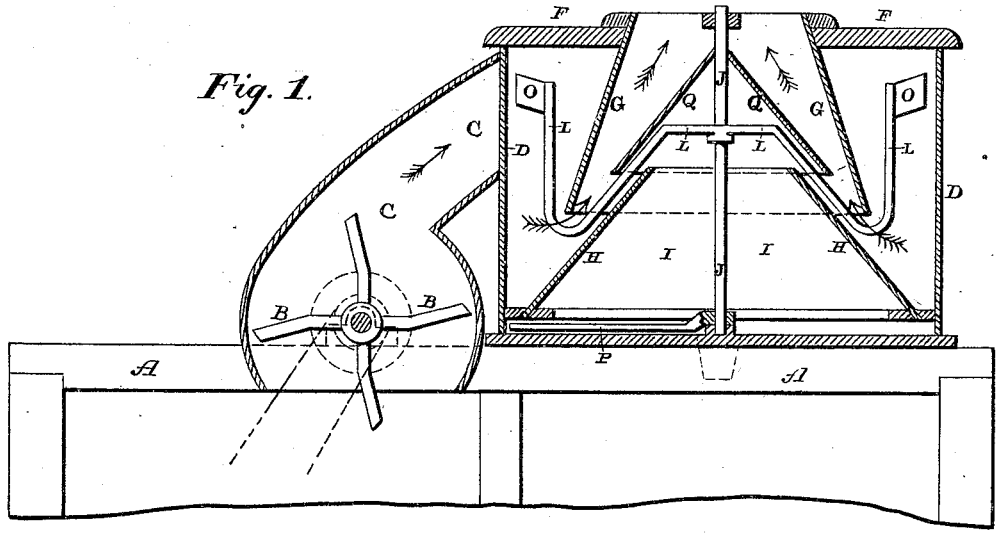
Figure 2:
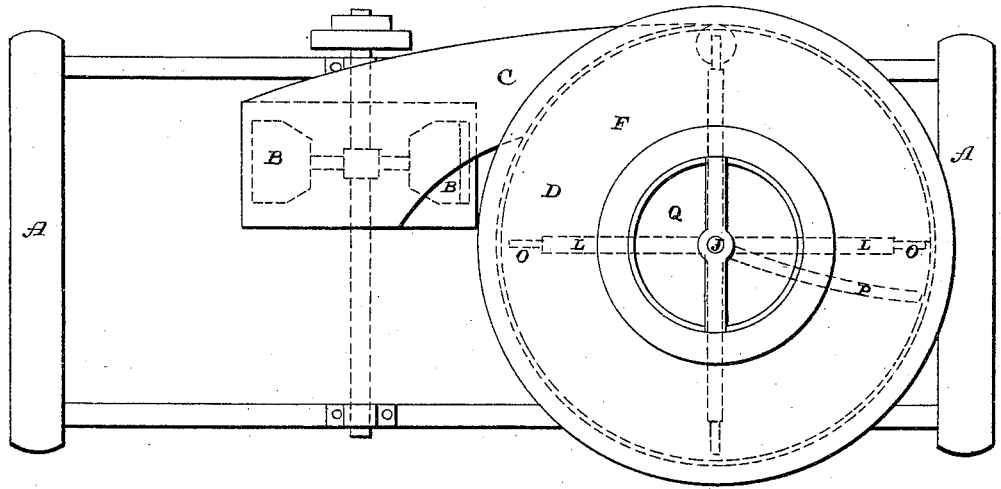

Figure 1 is a vertical section of a dust-collector which embodies my invention. Fig. 2 is a plan view of the same, some of the parts being shown in dotted lines.

A represents the frame in which the shaking screen is placed, and B the fan, which is placed in the upper part of this frame and driven by any suitable mechanism, and which takes the dust directly from the shaking screen and forces it through the pipe C into the frame or casing D, which is here shown of a circular form. The top and bottom portions of this frame D may be formed of wood, while the sides or vertical portions are formed of sheet metal or any other suitable material. Through the top F is formed a circular opening of any desired size, through which the air escapes after having deposited its dust. Projecting downwardly from this opening is the stationary truncated cone G, which extends downward any suitable distance and forms a barrier to prevent the air as it comes from the fan from passing directly out through the opening in the top F. Rising either directly from the bottom or from suitable supports placed therein is the stationary truncated cone H, which has its upper end to extend any suitable distance up into the cone G, and this cone serves both to catch the dust upon its outer side as the air escapes under the lower edges of the cone G and forms inside of it the dust-receiving chamber I. Journaled in suitable bearings in the center of this dust-collector is a shaft J, which may extend upward any suitable distance and from which project any desired number of arms L, which first extend horizontally out from the shaft, and then are bent downward, so as to pass between the two cones G H, and then upward to near the top F, where they are provided with wings O, against which the current of air from the fan strikes for the purpose of causing the shaft J to revolve. Secured to this shaft at its lower end is an arm P of any suitable shape or construction, and which serves to force the dust which has collected in the chamber I toward the opening through one side, from which point the dust is spouted away. Secured to the shaft near its upper end is the revolving cone Q, which extends down any suitable distance, and which serves to intercept the dust which is carried up by the air as it passes between the two cones G H. The air must first descend so as to pass under the lower edges of the cone G, and this forces the greater portion of the dust down directly upon the outer surface of the cone H, and it rises with the air along the outer surface of the cone H and catches under the cone Q, and is then deposited inside of the chamber I, while the air escapes through the opening in the top F.

It will be seen that the only movable parts in this dust-collector are operated entirely by the current of air from the fan, and hence no belts or other operating parts are necessary in this connection. The parts are few, simple, not liable to get out of order, and are very effective in operation.

Having thus described my invention, I claim—

1. The combination of the fan, the frame D, having an oblique opening through its top, the truncated cone G, which extends downward from the top, the truncated cone H, which projects upward from the bottom of the frame D, a shaft, a cone Q, attached thereto, and arms connected to the shaft, having wings, substantially as described.

2. The combination of the fan, the frame D, having an oblique opening through its top, the cone G, which projects downward from the opening, the truncated cone H, which extends upward from the bottom of the frame, the shaft J, provided with arms and wings, so as to be operated by the current of air, the cone Q, secured to the shaft, and the arm for discharging the dust from the dust-receiver, substantially as set forth.

3. In a dust-collector, the combination of a casing having an oblique induct, a depending truncated cone at the top of the casing, the casing having an outlet-opening in its top within the cone, and an inlet-opening in its side above the bottom of the cone, a truncated cone at the bottom of the casing, having its upper end extending within the said upper cone, and a cone within the upper cone and above the lower cone and its lower edge extending beyond the circumference of the upper end of the lower cone, and a fan, whereby the dust deposited upon the outer surface of the lower cone is caught by the upper cone as it is forced up by the air, substantially as described.

4. In a dust-collector, the combination of a casing, a depending truncated cone at the top of the casing, the casing having an outlet-opening within the said cone, and an oblique inlet-opening in its side above the bottom of the upper cone, an open-ended cone at the bottom of the casing, having its upper end extending within the said upper cone, a rotary shaft passing through the said cones, a cone secured to the shaft above the lower cone, its lower open end surrounding the upper end of the lower cone, whereby the dust deposited upon the outer surface of the lower cone is caught by the upper cone as it is forced up by the air and falls within the lower cone, and an arm attached to the lower end of the shaft for removing the dust from the lower end of the casing, substantially as shown and described.

5. In a dust-collector, the combination of the casing having a depending truncated cone at its top, an outlet-opening within the cone, an open-ended cone at the bottom, having its upper end extending into the upper cone, a rotary shaft extending through the cones, a cone within the upper cone, secured to the shaft above the lower cone and its lower edge extending beyond the periphery of the lower cone, and arms connected with the shaft and extending down under the upper cone and then up and carrying wings on their upper ends, the said casing having an oblique opening at its top, substantially as shown and described.

In testimony whereof I affix my signature in presence of two witnesses.

ABRAHAM N. WOLF.

Witnesses:
CHAS. M. RUHE,
ROBERT P. KEARNS.